United States Patent
Lee et al.

(10) Patent No.: US 12,533,071 B2
(45) Date of Patent: Jan. 27, 2026

(54) METHOD AND APPARATUS FOR VISUALIZING ELECTROCARDIOGRAM USING DEEP LEARNING

(71) Applicant: SEERSTECHNOLOGY CO., LTD., Seongnam-si (KR)

(72) Inventors: Youngshin Lee, Yongin-si (KR); Heeseok Song, Hwaseong-si (KR); Hoohyun Kim, Guri-si (KR)

(73) Assignee: SEERSTECHNOLOGY CO., LTD. (KR)

( * ) Notice: Subject to any disclaimer, the term of this patent is extended or adjusted under 35 U.S.C. 154(b) by 346 days.

(21) Appl. No.: 17/796,624

(22) PCT Filed: Dec. 29, 2020

(86) PCT No.: PCT/KR2020/019332
§ 371 (c)(1),
(2) Date: Jul. 29, 2022

(87) PCT Pub. No.: WO2022/145519
PCT Pub. Date: Jul. 7, 2022

(65) Prior Publication Data
US 2023/0060007 A1    Feb. 23, 2023

(30) Foreign Application Priority Data
Dec. 29, 2020   (KR) .......................... 10-2020-0186069

(51) Int. Cl.
*A61B 5/364* (2021.01)
*A61B 5/00* (2006.01)
(Continued)

(52) U.S. Cl.
CPC .............. *A61B 5/364* (2021.01); *A61B 5/339* (2021.01); *A61B 5/353* (2021.01); *A61B 5/355* (2021.01)

(58) Field of Classification Search
CPC ...................................................... A61B 5/364
See application file for complete search history.

(56) References Cited

U.S. PATENT DOCUMENTS

2004/0010294 A1*   1/2004   Kleine .................. A61N 1/368
607/18
2013/0289642 A1*  10/2013   Hedberg ............... A61N 1/365
607/25
(Continued)

FOREIGN PATENT DOCUMENTS

KR   20130050817 A   5/2013
KR   20140063100 A   5/2014
(Continued)

OTHER PUBLICATIONS

International Search Report for PCT/KR2020/019332, mailed Sep. 24, 2021.

*Primary Examiner* — Benjamin J Klein
*Assistant Examiner* — Thien Jason Tran
(74) *Attorney, Agent, or Firm* — Renaissance IP Law Group LLP (57) ABSTRACT

Disclosed are a method and apparatus for visualizing an electrocardiogram using deep learning.
The present embodiment provides a method and apparatus for visualizing an electrocardiogram, the method and apparatus which analyze an electrocardiogram using a deep learning algorithm for accurate arrhythmia determination as a real-time operation algorithm for monitoring a bedridden patient in order to solve the manpower shortage of medical staff, and then visually output it in real time so that a visual help may be provided for medical staff.

12 Claims, 10 Drawing Sheets

(51) Int. Cl.
*A61B 5/339* (2021.01)
*A61B 5/353* (2021.01)
*A61B 5/355* (2021.01)

(56) References Cited

U.S. PATENT DOCUMENTS

2017/0014042 A1* 1/2017 Nogami .................. A61B 5/283
2021/0052175 A1* 2/2021 Stephens ................ A61B 5/721
2021/0128076 A1* 5/2021 Shi ......................... G16H 10/60

FOREIGN PATENT DOCUMENTS

| KR | 20180037525 A | | 4/2018 |
| KR | 20190141326 A | * | 12/2019 |
| KR | 20200052452 A | | 5/2020 |

* cited by examiner

METHOD AND APPARATUS FOR VISUALIZING ELECTROCARDIOGRAM USING DEEP LEARNING

TECHNICAL FIELD

An embodiment of the present disclosure relates to a method and apparatus for visualizing an electrocardiogram using deep learning.

BACKGROUND ART

The content described below simply provides background information only related to the present embodiment, but does not constitute the conventional art.

An electrocardiogram reading system which helps medical staff analyze an electrocardiogram has been developed. A conventional electrocardiogram reading system detects R, P, and T peaks of waveforms, and detects and classifies arrhythmias based on a rule.

A conventional electrocardiogram reading system receives and analyzes the entire electrocardiogram signal data of a patient and outputs the result. Deep learning technology has recently been studied a lot as an electrocardiogram reading algorithm since it has higher accuracy than existing methods.

Arrhythmia determination using an electrocardiogram can only be performed by medical staff with certain qualifications, but the reality is that there is a shortage of manpower compared to the demand. When reading the electrocardiogram, it takes a lot of time since electrocardiogram signals need to be read from various viewpoints, such as calculating the time difference between the shapes and sections of the P, QRS, and T waveforms, and analyzing the electrocardiogram rhythms. A bedridden patient's electrocardiogram should be observed in real time by medical staff to keep an eye on the patient's condition, but continuous monitoring is difficult due to a shortage of manpower. Since electrocardiogram analysis is directly related to the patient's life, it should be accurate and should be operated quickly when an emergency patient occurs.

There is a case that conventional electrocardiogram analysis uses the endpoints, start points, etc. of P, QRS, and T waveform sections, but the conventional art finds only the peak and its utility is low. Designing of a rule-based algorithm during arrhythmia detection and classification has a deteriorated accuracy due to the diversity of waveforms, and a new rule-based algorithm should be designed when an arrhythmia is added.

The conventional electrocardiogram reading system cannot be utilized where real-time reading is required, such as monitoring a bedridden patient. A deep learning algorithm for electrocardiogram analysis has a speed difference depending on the implementation model, and cannot operate every hour for real-time operation. When visualizing an electrocardiogram waveform, it is an output for one-dimensional data, and readability is decreased when reading it in real time.

DISCLOSURE

Technical Problem

An object of the present embodiment is to provide a method and apparatus for visualizing an electrocardiogram using deep learning, which analyze the electrocardiogram using a deep learning algorithm for accurate arrhythmia determination as a real-time operation algorithm for monitoring a bedridden patient in order to solve the manpower shortage of medical staff, and then visually output it in real time so that a visual help may be provided to medical staff.

Technical Solution

According to an aspect of the present embodiment, there is provided an apparatus for analyzing an electrocardiogram, the apparatus including: an input unit for receiving an electrocardiogram signal; an electrocardiogram waveform division unit for dividing electrocardiogram waveforms from the electrocardiogram signal using an electrocardiogram waveform area classification algorithm; a waveform detection unit for generating a confirmation result of confirming whether a V waveform among the electrocardiogram waveforms is detected or not; an arrhythmia discrimination unit for generating an arrhythmia discrimination result of discriminating an electrocardiogram arrhythmia using an electrocardiogram arrhythmia reading algorithm based on the confirmation result; and a visualization unit for visualizing the electrocardiogram waveforms and the arrhythmia discrimination result.

According to another aspect of the present embodiment, there is provided a method for visualizing an electrocardiogram, the method comprising the processes of: receiving an electrocardiogram signal; dividing electrocardiogram waveforms from the electrocardiogram signal using an electrocardiogram waveform area classification algorithm; generating a confirmation result of confirming whether a V waveform among the electrocardiogram waveforms is detected or not; generating an arrhythmia discrimination result of discriminating an electrocardiogram arrhythmia using an electrocardiogram arrhythmia reading algorithm based on the confirmation result; and visualizing the electrocardiogram waveforms and the arrhythmia discrimination result.

Advantageous Effects

According to the present embodiment as described above, there is an effect which analyzes an electrocardiogram using a deep learning algorithm for accurate arrhythmia determination as a real-time operation algorithm for monitoring a bedridden patient in order to solve the manpower shortage of medical staff, and then visually outputs it in real time so that a visual help may be provided for medical staff.

According to the present embodiment, there are effects of enabling the corresponding inventive concept to be applied to signal analysis based on a one-dimensional signal in addition to an electrocardiogram and enabling a signal composed of a set of various waveforms as in the electrocardiogram to increase readability using the visualization part of the corresponding inventive concept.

According to the present embodiment, there are effects that an electrocardiogram is automatically read to meet the supply according to the demand, the electrocardiogram reading speed of medical staff can be increased through electrocardiogram visualization, and it can be applied to an in-patient monitoring (IPM) system which needs to determine the condition of a bedridden patient in real time.

MODE

Hereinafter, the present embodiment will be described in detail with reference to the accompanying drawings.

Figure 1:
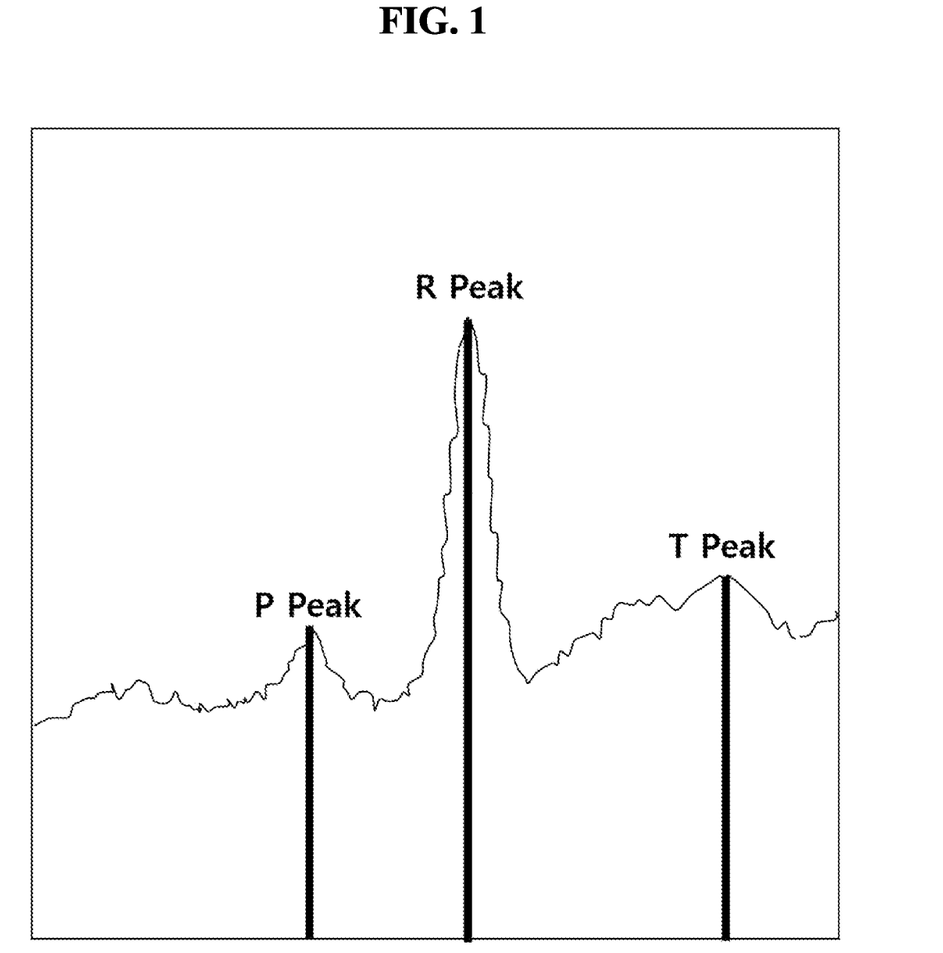
FIG. 1 is a view showing peak detection for each waveform of a conventional electrocardiogram reading system.
Figure 2:
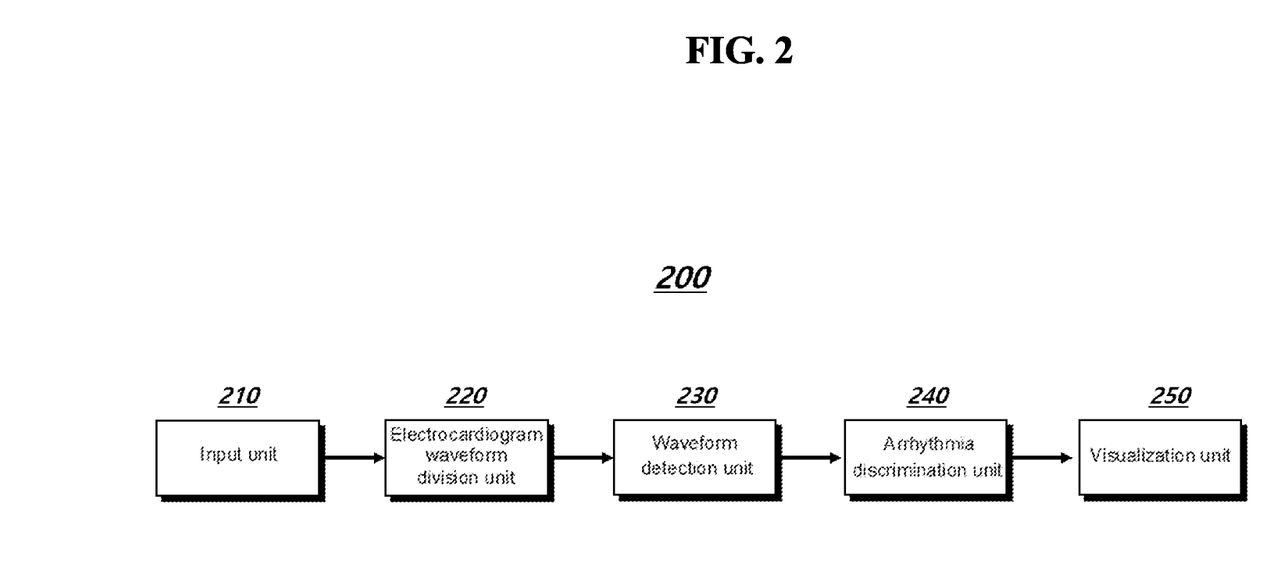
FIG. 2 is a view showing an apparatus for analyzing an electrocardiogram according to the present embodiment.

FIG. 2 is a view showing an apparatus for analyzing an electrocardiogram according to the present embodiment.

The apparatus for analyzing an electrocardiogram 200 according to the present embodiment includes an input unit 210, an electrocardiogram waveform division unit 220, a waveform detection unit 230, an arrhythmia discrimination unit 240, and a visualization unit 250. Components included in the apparatus for analyzing an electrocardiogram 200 are not necessarily limited thereto.

The respective components included in the apparatus for analyzing an electrocardiogram 200 may be connected to a communication path that connects a software module or a hardware module inside the apparatus so that they organically operate with each other. These components communicate using one or more communication buses or signal lines.

Each component of the apparatus for analyzing an electrocardiogram 200 shown in FIG. 2 means a unit for processing at least one function or operation, and may be implemented as a software module, a hardware module, or a combination of software and hardware.

The input unit 210 receives an electrocardiogram signal. The input unit 210 normalizes the electrocardiogram signal to a preset time interval range.

The electrocardiogram waveform division unit 220 divides electrocardiogram waveforms from the electrocardiogram signal by using the electrocardiogram waveform area classification algorithm. The electrocardiogram waveform division unit 220 executes the electrocardiogram waveform area classification algorithm every predetermined time based on a preset operation schedule.

The electrocardiogram waveform division unit 220 calculates a small number of parameters due to the fully connected layer not included in the hidden layer of the 1D CNN Auto Encoder by using a 1D Convolution (CNN) Auto Encoder of the electrocardiogram waveform area classification algorithm to a preset time interval range, thereby outputting it in the form of a heat-map of the area according to the waveform.

The electrocardiogram waveform division unit 220 divides the electrocardiogram waveforms into a P waveform region, a QRS waveform region, a T waveform region, and a V waveform region in a preset time interval range from the electrocardiogram signal by using the electrocardiogram waveform area classification algorithm, and designates the regions.

The electrocardiogram waveform division unit 220 divides the electrocardiogram waveforms into the P waveform region, the QRS waveform region, the T waveform region, and the V waveform region in the preset time interval range, performs labeling, and then executes the electrocardiogram waveform area classification algorithm every second preset time after the first preset time has elapsed.

The electrocardiogram waveform division unit 220 designates the depolarization of the atrium starting from the sinoatrial (SA) node among the electrocardiogram waveforms as the P wave region from the electrocardiogram signal by using the electrocardiogram waveform area classification algorithm. The electrocardiogram waveform division unit 220 designates the depolarization of the ventricle after the atrioventricular (AV) node among the electrocardiogram waveforms as the QRS waveform region from the electrocardiogram signal by using the electrocardiogram waveform area classification algorithm. The electrocardiogram waveform division unit 220 designates the repolarization of the ventricle among the electrocardiogram waveforms as the T wave region from the electrocardiogram signal by using the electrocardiogram waveform area classification algorithm. The electrocardiogram waveform division unit 220 designates an arrhythmia or abnormal waveform among the electrocardiogram waveforms as the V waveform region from the electrocardiogram signal by using the electrocardiogram waveform area classification algorithm.

The waveform detection unit 230 generates a confirmation result of confirming whether a V waveform (arrhythmic waveform) among the electrocardiogram waveforms is detected or not.

The arrhythmia discrimination unit 240 generates an arrhythmia discrimination result obtained by discriminating the electrocardiogram arrhythmia using the electrocardiogram arrhythmia reading algorithm based on the confirmation result generated from the waveform detection unit 230. The arrhythmia discrimination unit 240 detects the V waveform based on the confirmation result of the waveform detection unit 230, samples the waveform for a predetermined time, and then executes the arrhythmia reading algorithm once.

The arrhythmia discrimination unit 240 applies a 1D CNN classification deep learning model as the electrocardiogram arrhythmia reading algorithm, detects the V waveform based on the confirmation result generated from the waveform detection unit 230, samples the waveform for a predetermined time, and then executes the arrhythmia reading algorithm.

When it is confirmed that the V waveform is detected based on the confirmation result generated from the waveform detection unit 230, the arrhythmia discrimination unit 240 generates arrhythmia reading sampling data obtained by sampling the waveform from the start point of the V waveform to a preset time. The arrhythmia discrimination unit 240 normalizes the arrhythmia reading sampling data and then inputs it to the arrhythmia reading algorithm. Thereafter, the arrhythmia discrimination unit 240 outputs it as a probability value for each arrhythmia using the arrhythmia reading algorithm and outputs the highest probability value as a reading result for the corresponding waveform.

The visualization unit 250 visualizes the electrocardiogram waveforms and the arrhythmia discrimination result. The visualization unit 250 visualizes the electrocardiogram waveforms and the arrhythmia discrimination result in a one-dimensional form. The visualization unit 250 outputs the P waveform, the QRS waveform, the T waveform, and the V waveform included in the electrocardiogram waveforms, and the arrhythmia discrimination result so that their colors are different from each other. The visualization unit 250 outputs the name of the waveform above the peak point of each waveform.

The visualization unit 250 outputs the electrocardiogram waveforms and the background color as distinct colors. The visualization unit 250 sets and outputs the P waveform as a preset first color (e.g., blue). The visualization unit 250 sets and outputs the QRS waveform as a preset second color (e.g., green). The visualization unit 250 sets and outputs the T waveform as a preset third color (e.g., red). The visualization unit 250 sets and outputs the V waveform as a preset fourth color (e.g., pink).

Figure 3:
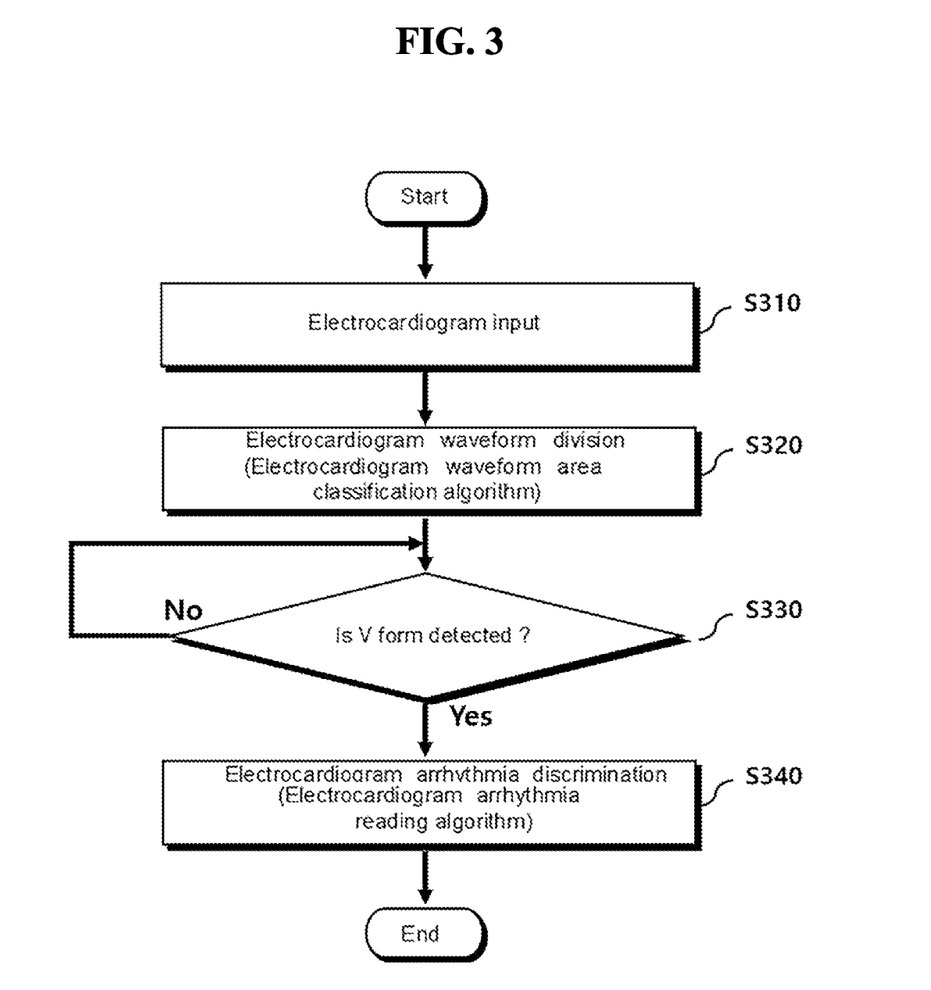
FIG. 3 is a view showing a deep learning-based real time electrocardiogram analysis algorithm according to the present embodiment.

FIG. 3 is a view showing a deep learning-based real time electrocardiogram analysis algorithm according to the present embodiment.

The apparatus for analyzing an electrocardiogram 200 according to the present embodiment visualizes the analysis results in a way that improves readability by quickly and accurately analyzing real-time electrocardiogram waveforms using a deep learning-based electrocardiogram analysis algorithm operated in real time.

The apparatus for analyzing an electrocardiogram 200 operates using an appropriate operation schedule since the deep learning algorithm for electrocardiogram analysis has a speed difference depending on the implementation model and cannot operate every hour.

The apparatus for analyzing an electrocardiogram 200 receives an electrocardiogram (S310). The apparatus for analyzing an electrocardiogram 200 classifies a waveform for the input electrocardiogram (S320). In the step S320, the apparatus for analyzing an electrocardiogram 200 divides a waveform for the input electrocardiogram using the electrocardiogram waveform area classification algorithm.

The apparatus for analyzing an electrocardiogram 200 checks whether a V waveform among the waveforms for the electrocardiogram is detected or not (S330). As a result of checking the step S330, when the V waveform among the waveforms for the electrocardiogram is detected, the apparatus for analyzing an electrocardiogram 200 discriminates it as an electrocardiogram arrhythmia (S340). In the step S340, the apparatus for analyzing an electrocardiogram 200 discriminates it as the electrocardiogram arrhythmia when the V waveform among the waveforms for the electrocardiogram is detected using the electrocardiogram arrhythmia reading algorithm.

Although it is described in FIG. 2 that the steps S310 to S340 are sequentially executed, it is not necessarily limited thereto. In other words, since it will be applicable by changing and executing the steps described in FIG. 2 or by executing one or more steps in parallel, FIG. 2 is not limited to a time-series order.

As described above, the deep learning-based real time electrocardiogram analysis algorithm according to the present embodiment described in FIG. 2 may be implemented by a program and recorded in a computer-readable recording medium. The recording medium in which the program for implementing the deep learning-based real time electrocardiogram analysis algorithm according to the present embodiment is recorded and which can be read by a computer includes all kinds of recording devices in which data that can be read by the computer system is stored.

Figure 4:
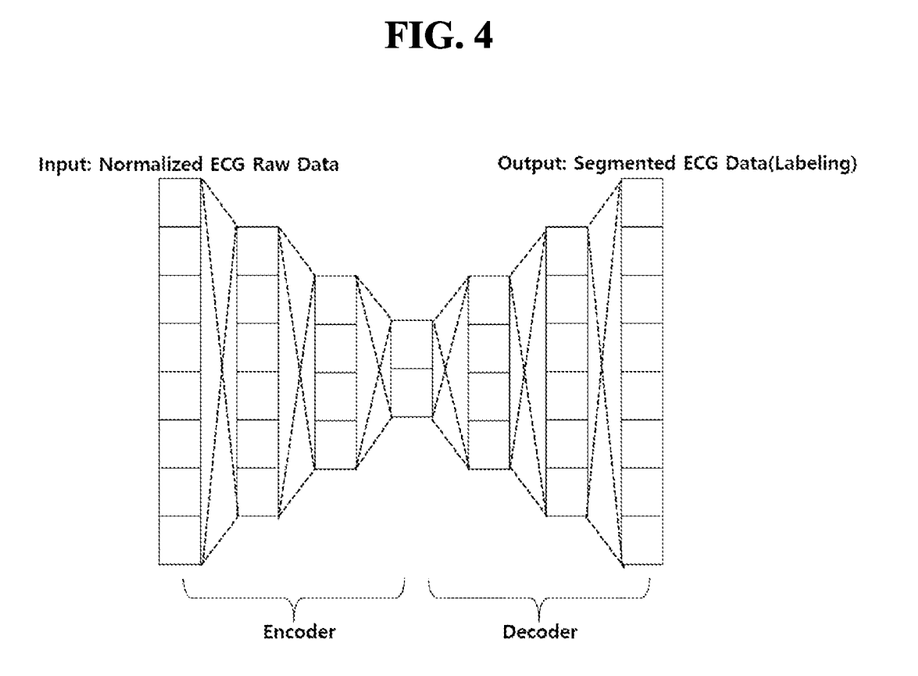
FIG. 4 is a view showing an Auto Encoder for electrocardiogram waveform area classification according to the present embodiment.

FIG. 4 is a view showing an Auto Encoder for electrocardiogram waveform area classification according to the present embodiment.

The apparatus for analyzing an electrocardiogram 200 operates the algorithm by a Corse To Fine method for a fast algorithm speed. The apparatus for analyzing an electrocardiogram 200 divides a deep learning algorithm into an electrocardiogram waveform area classification algorithm (Corse) and an electrocardiogram arrhythmia reading algorithm (Fine).

The apparatus for analyzing an electrocardiogram 200 divides each important waveform of the electrocardiogram using the electrocardiogram waveform area classification algorithm (Corse) and designates a region.

The apparatus for analyzing an electrocardiogram 200 uses a 1D Convolution (CNN) Auto Encoder of the area classification algorithm. Since the 1D CNN Auto Encoder does not include a fully connected layer in the hidden layer, the number of parameters is small so that the speed is fast, and since it is output in the form of a heat-map of the area according to the waveform, it is good to match with the original signal.

Figure 5:
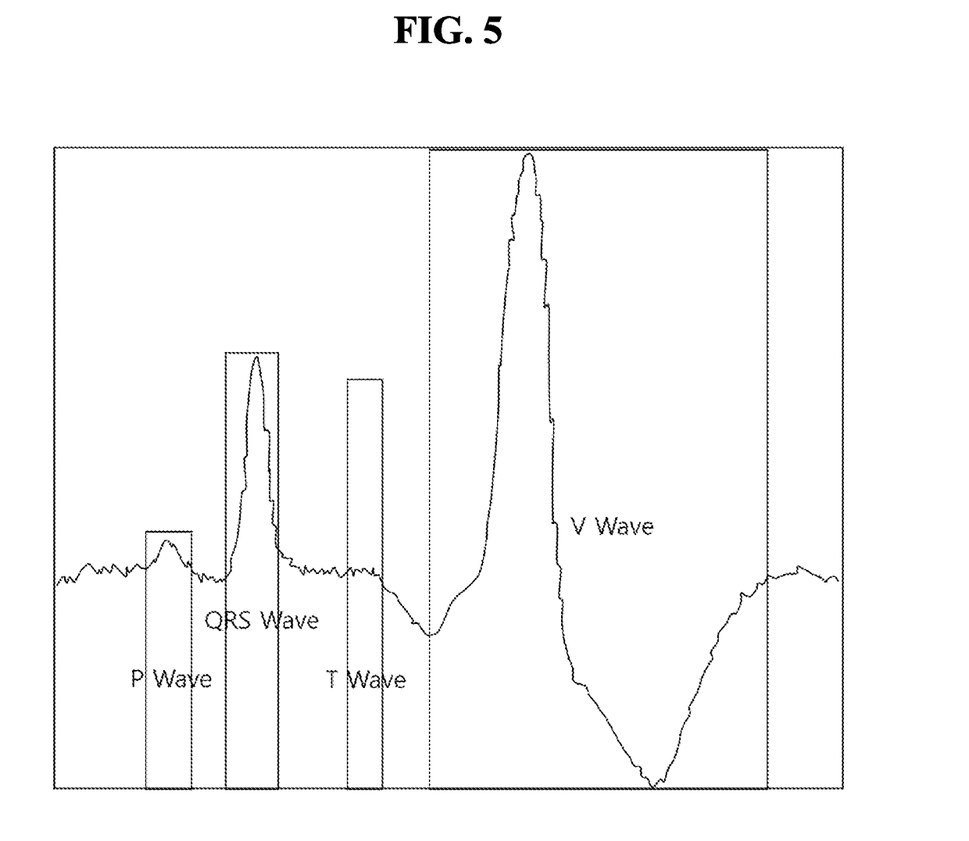
FIG. 5 is a view showing results of an electrocardiogram waveform area classification algorithm according to the present embodiment.

FIG. 5 is a view showing results of an electrocardiogram waveform area classification algorithm according to the present embodiment.

The apparatus for analyzing an electrocardiogram 200 divides each important waveform of the electrocardiogram using the electrocardiogram waveform area classification algorithm (Corse) and designates a region. The apparatus for analyzing an electrocardiogram 200 divides it into a P waveform region, a QRS waveform region, a T waveform region, and a V waveform region as important waveform regions, and designates the regions.

As shown in FIG. 5, the apparatus for analyzing an electrocardiogram 200 designates the depolarization of the atrium that is started from the SA node among the waveforms of the electrocardiogram as the P wave region. The apparatus for analyzing an electrocardiogram 200 designates the depolarization of the ventricle after the atrioventricular node (AV node) among the waveforms of the electrocardiogram as the QRS waveform region. The apparatus for analyzing an electrocardiogram 200 designates the repolarization of the ventricle among the waveforms of the electrocardiogram as the T waveform region. The apparatus for analyzing an electrocardiogram 200 designates an arrhythmia or abnormal waveform among the waveforms of the electrocardiogram as the V waveform region.

Figure 6:
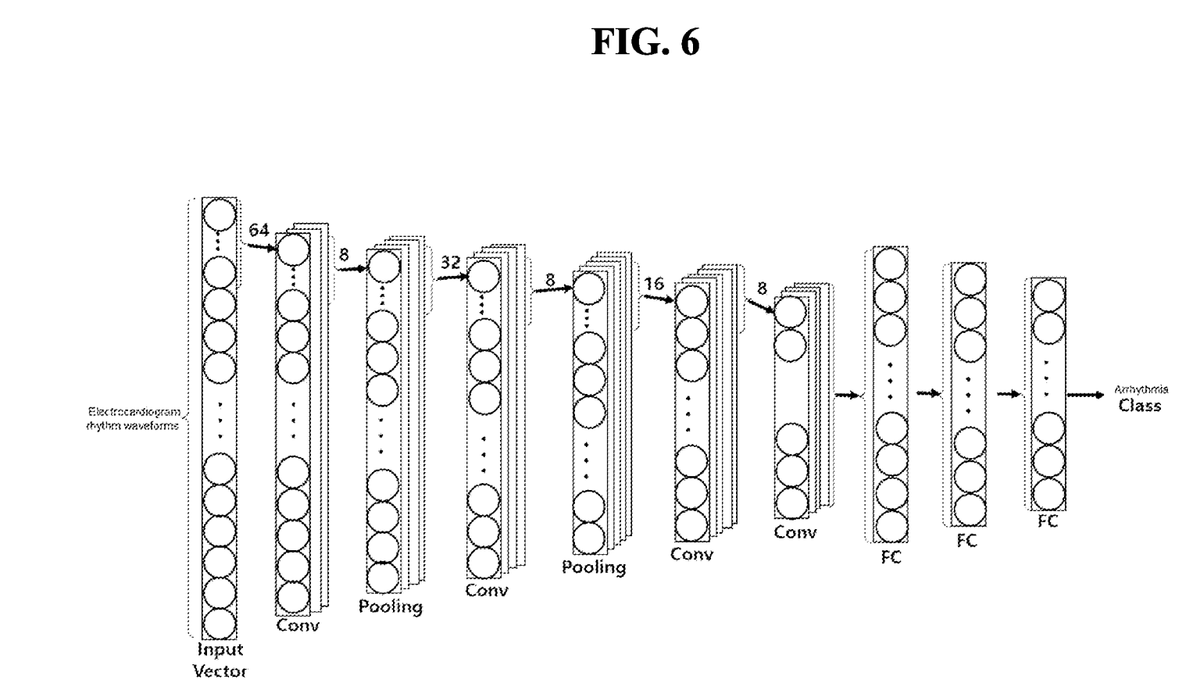
FIG. 6 is a view showing a deep learning model for an electrocardiogram reading algorithm according to the present embodiment.

FIG. 6 is a view showing a deep learning model for an electrocardiogram reading algorithm according to the present embodiment.

The apparatus for analyzing an electrocardiogram 200 uses a 1D CNN classification deep learning model which has a slow algorithm driving speed, but has excellent classification performance in order to perform accurate reading with an arrhythmia reading algorithm.

The apparatus for analyzing an electrocardiogram 200 executes the electrocardiogram waveform area classification algorithm at regular intervals. The apparatus for analyzing an electrocardiogram 200 executes the arrhythmia reading algorithm once after sampling the waveform for a predetermined time after the V (arrhythmia) waveform is detected in the electrocardiogram waveform area classification algorithm.

Figure 7:
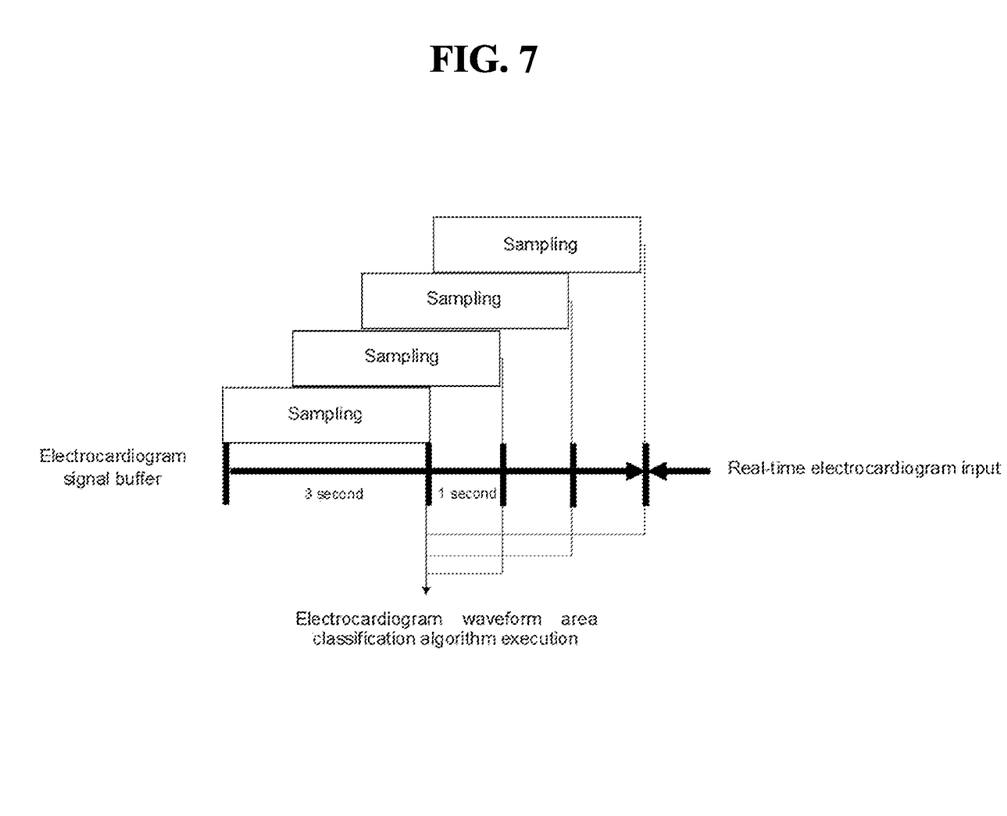
FIG. 7 is a view showing an execution time of the electrocardiogram waveform area classification algorithm according to the present embodiment.

FIG. 7 is a view showing an execution time of the electrocardiogram waveform area classification algorithm according to the present embodiment.

The apparatus for analyzing an electrocardiogram 200 first quickly divides an electrocardiogram signal input in real time into areas using the electrocardiogram waveform area classification algorithm as an algorithm.

The apparatus for analyzing an electrocardiogram 200 receives data of a normalized electrocardiogram signal having an interval range of 3 seconds as an input waveform. Here, a method for normalizing the received electrocardiogram signal of the apparatus for analyzing an electrocardiogram 200 is the same as in Equation 1.

$$Z_{norm}=(x-x_{avg})/x_{std}]$$ [Equation 1]

The apparatus for analyzing an electrocardiogram 200 labels the P, QRS, T, and V (arrhythmic) waveforms corresponding to the interval range of 3 seconds as the output waveforms.

The apparatus for analyzing an electrocardiogram 200 executes the electrocardiogram waveform area classification algorithm every 1 second after the initial 3 seconds in order to update the electrocardiogram waveform area classification algorithm in real time.

Figure 8:
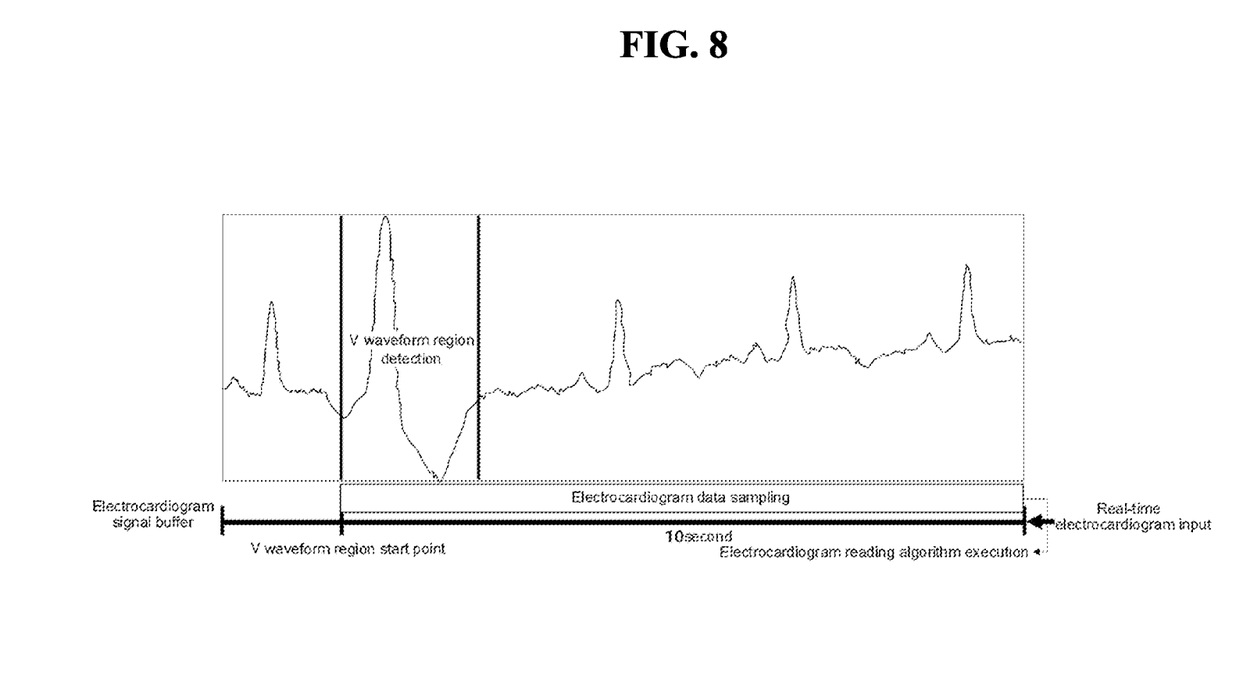
FIG. 8 is a view showing the setting of the execution section of an electrocardiogram arrhythmia reading algorithm according to the present embodiment.

FIG. 8 is a view showing the setting of the execution section of an electrocardiogram arrhythmia reading algorithm according to the present embodiment.

When a V waveform is detected among the waveforms divided in real time, the apparatus for analyzing an electrocardiogram 200 performs arrhythmia reading by sampling from the V waveform start point to a predetermined section. The apparatus for analyzing an electrocardiogram 200 samples and normalizes the data from the V waveform detection start point to 10 seconds, and then inputs it to the arrhythmia reading algorithm.

The apparatus for analyzing an electrocardiogram 200 outputs the probability value for each arrhythmia through the 1D CNN algorithm using the arrhythmia reading algorithm, and outputs the highest probability value as the reading result for the corresponding waveform.

Figure 9A:
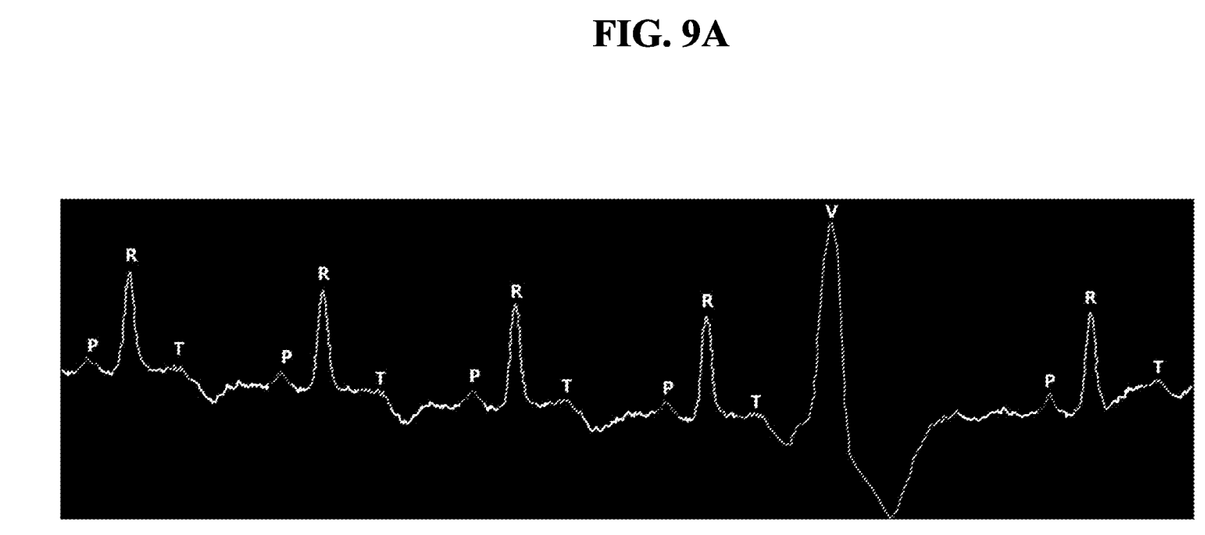
FIGS. 9A and 9B are views showing electrocardiogram visualization using an electrocardiogram analysis system according to the present embodiment.
Figure 9B:
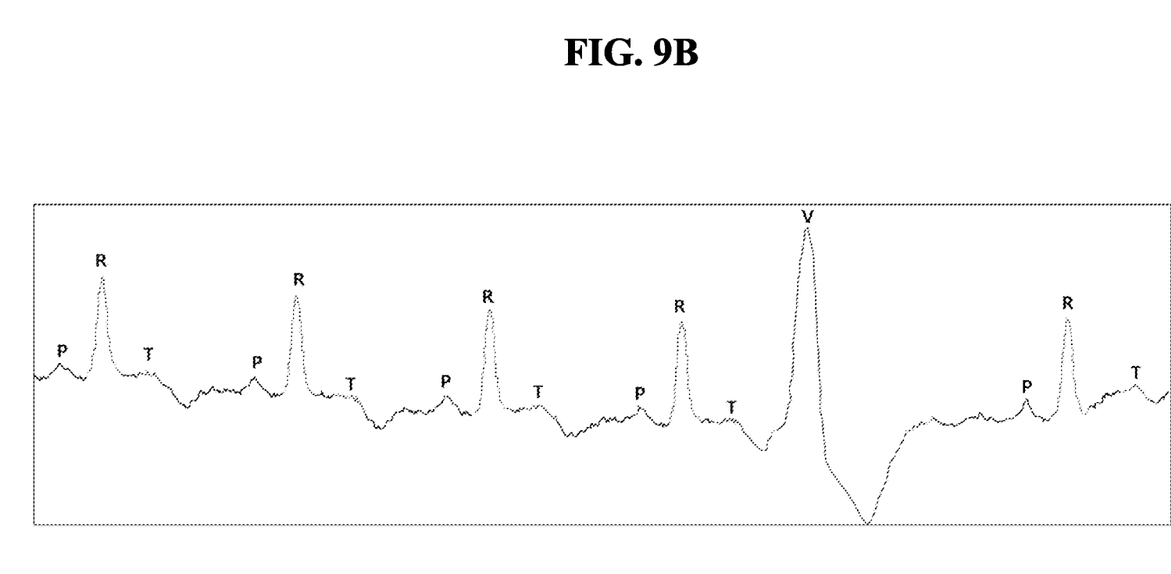

FIGS. 9A and 9B are views showing electrocardiogram visualization using an electrocardiogram analysis system according to the present embodiment.

The apparatus for analyzing an electrocardiogram 200 visualizes the stored result using the electrocardiogram waveform area classification algorithm so that the medical staff can easily read the corresponding electrocardiogram signal. When the electrocardiogram signal is input in real time, the apparatus for analyzing an electrocardiogram 200 performs visualization in a one-dimensional form.

When the electrocardiogram waveform area classification algorithm is started and classification is completed, the apparatus for analyzing an electrocardiogram 200 sets a different color for each classified waveform and outputs the name of the waveform on the peak point of each waveform. The apparatus for analyzing an electrocardiogram 200 sets the background color to black (for example, or white) so that colors for each waveform can be distinguished.

The apparatus for analyzing an electrocardiogram 200 sets a different color for each waveform. The apparatus for analyzing an electrocardiogram 200 sets the P waveform to blue and outputs it. The apparatus for analyzing an electrocardiogram 200 sets the QRS waveform to green and outputs it. The apparatus for analyzing an electrocardiogram 200 sets the T waveform to red and outputs it. The apparatus for analyzing an electrocardiogram 200 sets the V waveform to pink and outputs it.

The above description is merely exemplarily explaining the technical spirit of the present embodiment, and various modifications and variations will be possible without departing from the essential features of the present embodiment by those skilled in the art to which the present embodiment belongs. Accordingly, the present embodiments are intended to explain rather than limit the technical spirit of the present embodiment, and the scope of the technical spirit of the present embodiment is not limited by these embodiments. The protection scope of the present embodiment should be interpreted by the following claims, and all technical spirits within the scope equivalent thereto should be interpreted as being included in the right scope of the present embodiment.

EXPLANATION OF REFERENCE NUMERALS

200: Apparatus for analyzing an electrocardiogram
210: Input unit
220: Electrocardiogram waveform division unit
230: Waveform detection unit
240: Arrhythmia discrimination unit
250: Visualization unit

The invention claimed is:

1. An apparatus for analyzing an electrocardiogram by a computer program recorded in a computer-readable recording medium, the apparatus comprising:
an input module configured to receive an electrocardiogram signal from electrode patches of a patient;
a processor connected to the input module and configured to process at least one operation implemented as one or more software modules, wherein the one or more software modules comprises:
an electrocardiogram waveform division module configured to divide electrocardiogram waveforms from the electrocardiogram signal using an electrocardiogram waveform area classification algorithm;
a waveform detection module configured to generate a confirmation result confirming whether a V waveform among the electrocardiogram waveforms is detected;
an arrhythmia discrimination module configured to generate an arrhythmia discrimination result of discriminating an electrocardiogram arrhythmia using an electrocardiogram arrhythmia reading algorithm when the confirmation result indicates that the V waveform has been detected; and
a visualization module configured to visualize the electrocardiogram waveforms and the arrhythmia discrimination result,
wherein the electrocardiogram waveform division module is configured to divide the electrocardiogram waveforms into a P waveform region, a QRS waveform region, a T waveform region, and a V waveform region in a preset time interval range from the electrocardiogram signal by using the electrocardiogram waveform area classification algorithm, and designate the regions,
wherein the electrocardiogram waveform division module is configured to use a 1D Convolution (CNN) Auto Encoder of the electrocardiogram waveform area classification algorithm to a preset time interval range, wherein the 1D CNN Auto Encoder does not include a fully connected layer in a hidden layer thereof, thereby outputting it in a form of a heat-map of an area according to the waveform, and
wherein the arrhythmia discrimination module is configured to apply a 1D CNN classification deep learning model as the electrocardiogram arrhythmia reading algorithm, detect the V waveform based on the confirmation result generated from the waveform detection module, sample the waveform for a predetermined time, and execute the arrhythmia reading algorithm.

2. The apparatus of claim 1, wherein the input module is configured to normalize the electrocardiogram signal to a preset time interval range.

3. The apparatus of claim 1, wherein the electrocardiogram waveform division module is configured to divide the electrocardiogram waveforms into the P waveform region, the QRS waveform region, the T waveform region, and the V waveform region in the preset time interval range, perform labeling, and then execute the electrocardiogram waveform area classification algorithm every second preset time after a first preset time has elapsed.

4. The apparatus of claim 1, wherein the electrocardiogram waveform division module is configured to designate a depolarization of an atrium starting from a sinoatrial (SA) node among the electrocardiogram waveforms as a P wave region from the electrocardiogram signal by using the electrocardiogram waveform area classification algorithm.

5. The apparatus of claim 1, wherein the electrocardiogram waveform division module is configured to designate a depolarization of a ventricle after an atrioventricular (AV) node among the electrocardiogram waveforms as the QRS waveform region from the electrocardiogram signal by using the electrocardiogram waveform area classification algorithm.

6. The apparatus of claim 1, wherein the electrocardiogram waveform division module is configured to designate a repolarization of a ventricle among the electrocardiogram waveforms as a T wave region from the electrocardiogram signal by using the electrocardiogram waveform area classification algorithm.

7. The apparatus of claim 1, wherein the electrocardiogram waveform division module is configured to designate an arrhythmia or abnormal waveform among the electrocardiogram waveforms as the V waveform region from the electrocardiogram signal by using the electrocardiogram waveform area classification algorithm.

8. The apparatus of claim 1, wherein when it is confirmed that the V waveform is detected based on the confirmation result generated from the waveform detection module, the arrhythmia discrimination module is configured to generate arrhythmia reading sampling data obtained by sampling the waveform from a start point of the V waveform to a preset time, and the arrhythmia discrimination module is configured to normalize the arrhythmia reading sampling data, input the normalized data to the arrhythmia reading algorithm, and then output the input data as a probability value for each arrhythmia using the arrhythmia reading algorithm and output a highest probability value as a reading result for a corresponding waveform.

9. The apparatus of claim 8, wherein the visualization module is configured to visualize the electrocardiogram waveforms and the arrhythmia discrimination result in a one-dimensional form, outputs the P waveform, the QRS waveform, the T waveform, and the V waveform included in the electrocardiogram waveforms, and the arrhythmia discrimination result so that their colors are different from each other, and output a name of the waveform above a peak point of each waveform.

10. The apparatus of claim 9, wherein the visualization module is configured to output the electrocardiogram waveforms and a background color as distinct colors, sets and outputs the P waveform as a preset first color, set and output the QRS waveform as a preset second color, set and output the T waveform as a preset third color, and set and output the V waveform as a preset fourth color.

11. The apparatus of claim 1, wherein the electrocardiogram waveform division module is configured to execute the electrocardiogram waveform area classification algorithm every predetermined time based on a preset operation schedule, and the arrhythmia discrimination module is configured to detect the V waveform based on the confirmation result of the waveform detection module, sample the waveform for a predetermined time, and then execute the arrhythmia reading algorithm once.

12. A method for visualizing an electrocardiogram performed by a processor to process at least one operation implemented as one or more software module of an apparatus for analyzing an electrocardiogram by a computer program recorded in a computer-readable recording medium, the method comprising:
 receiving an electrocardiogram signal from electrode patches of a patient;
 dividing electrocardiogram waveforms from the electrocardiogram signal using an electrocardiogram waveform area classification algorithm, wherein the electrocardiogram waveforms is divided into a P waveform region, a QRS waveform region, a T waveform region, and a V waveform region in a preset time interval range from the electrocardiogram signal by using the electrocardiogram waveform area classification algorithm;
 generating a confirmation result of confirming whether a V waveform among the electrocardiogram waveforms is detected;
 applying a 1D CNN classification deep learning model as an electrocardiogram arrhythmia reading algorithm;
 detecting the V waveform based on the confirmation result generated from a waveform detection unit;
 sampling the waveform for a predetermined time, and then executing the electrocardiogram arrhythmia reading algorithm;
 generating an arrhythmia discrimination result of discriminating an electrocardiogram arrhythmia using the electrocardiogram arrhythmia reading algorithm when the confirmation result indicates that the V waveform has been detected;
 using a 1D Convolution (CNN) Auto Encoder of the electrocardiogram waveform area classification algorithm to a preset time interval range, wherein the 1D CNN Auto Encoder does not include a fully connected layer in a hidden layer thereof, thereby outputting it in a form of a heat-map of the area according to the waveform; and
 visualizing the electrocardiogram waveforms and the arrhythmia discrimination result.

* * * * *